United States Patent [19]

Lien

[11] 4,425,026

[45] Jan. 10, 1984

[54] REFOCUSING MIRROR MANIPULATOR

[75] Inventor: Neil C. Lien, Evansville, Wis.

[73] Assignee: Baker Manufacturing Company, Evansville, Wis.

[21] Appl. No.: 275,287

[22] Filed: Jun. 19, 1981

[51] Int. Cl.³ .............................................. G02B 5/10
[52] U.S. Cl. ..................................................... 350/295
[58] Field of Search ................................ 350/295, 288

[56] References Cited

U.S. PATENT DOCUMENTS

| | | | |
|---|---|---|---|
| 4,022,523 | 5/1977 | Lindonen et al. | 350/295 |
| 4,043,644 | 8/1977 | Humphrey | 350/295 |
| 4,059,346 | 11/1977 | Levine et al. | 350/295 |
| 4,129,365 | 12/1978 | Aversano et al. | 350/295 X |
| 4,196,972 | 4/1980 | Rawlings | 350/295 |

FOREIGN PATENT DOCUMENTS 400445 10/1933 United Kingdom ................ 350/295

Primary Examiner—John K. Corbin
Assistant Examiner—David Lewis
Attorney, Agent, or Firm—Isaksen, Lathrop, Esch, Hart & Clark

[57] ABSTRACT

A manipulator (10) for adjusting the curvature of a bendable refocusing mirror (72) which is positioned inside of a high-vacuum optical apparatus is disclosed which is particularly adapted so that manipulation of the curvature of the mirror (72) can be accomplished on the outside of the apparatus through adjustment of a manually operable micrometer (46). A single feed-through shaft (54) extends into the vacuum of the apparatus and is operable by the micrometer (46) so as to raise and lower one end each of a pair of drawbridge members (62, 64), each of which is attached to one end of the mirror (72) so that equal bending moments are applied at opposite ends of the mirror (72) so as to adjust the curvature thereof in a preselectable and uniform fashion.

9 Claims, 5 Drawing Figures

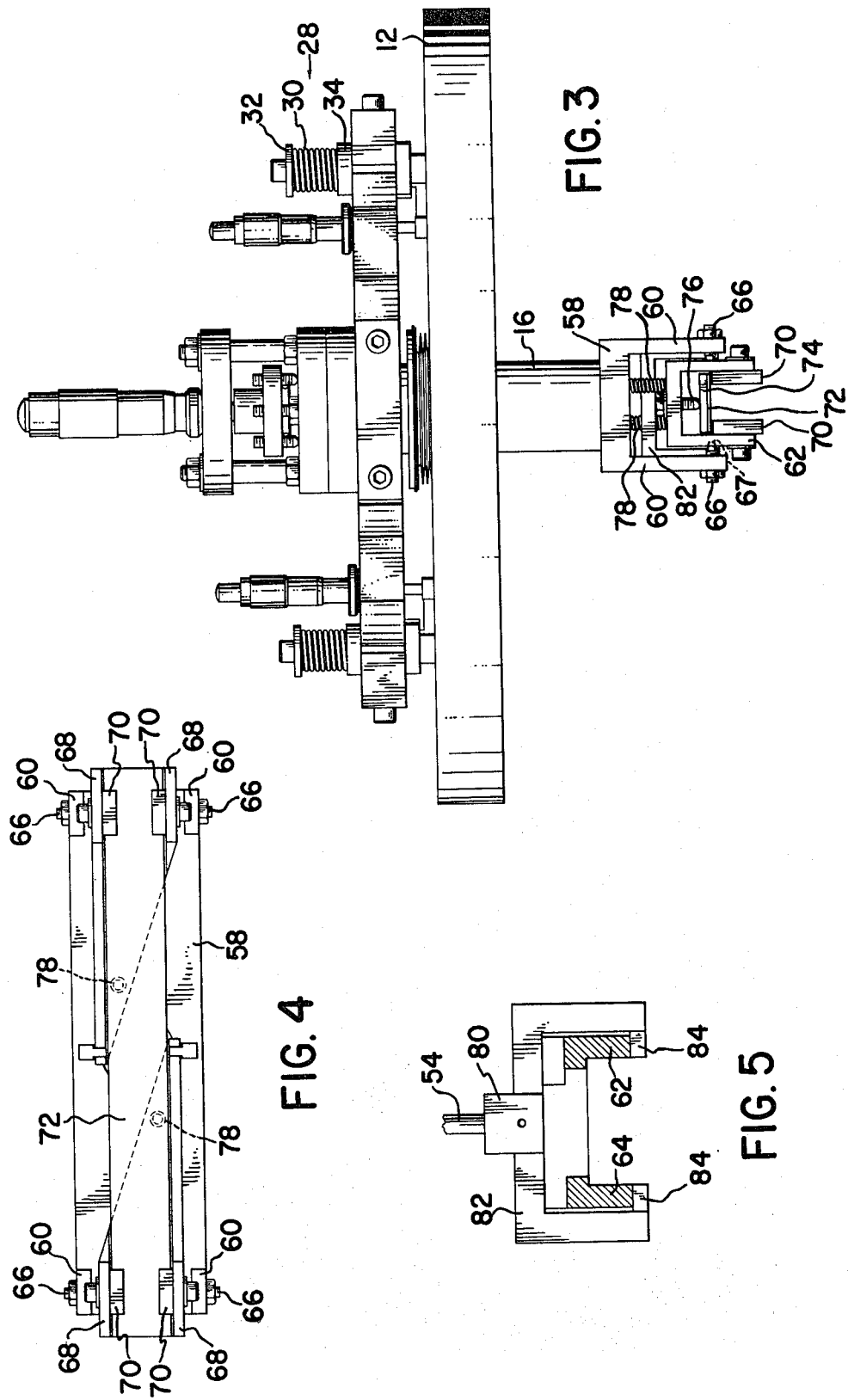

REFOCUSING MIRROR MANIPULATOR

FIELD OF THE INVENTION

The present invention relates to mirror manipulators for adjusting the curvature of curved optical mirrors, in general, and, in particular, to a manipulator for adjusting the curvature of a mirror contained inside of a high-vacuum optical apparatus with a minimum of mechanical parts extending through the containment of the vacuum of the optical apparatus.

DESCRIPTION OF THE PRIOR ART

The prior art is generally cognizant of the concept of adjusting the curvature of mirrors so as to adjust the optical characteristics, such as the focus, of the mirror. Examples of patents illustrating curved mirrors include U.S. Pat. No. 4,043,644, No. 4,059,346, No. 4,129,365 and No. 4,196,972. One example is known of a prior art patent which discloses an apparatus for bending opposite ends of a mirror so as to adjust the curvature throughout the entire length of the mirror. Such a patent is U.S. Pat. No. 4,022,523.

In addition, one refocusing mirror manipulator was known to have been constructed at Stanford University in conjunction with the their use of a monochromator for synchrotron radiation with the mirror being utilized to refocus the radiation exiting from the monochromator. That refocusing mirror manipulator included a pair of rotatably mounted members attached to opposite ends of a mirror and included a pair of vertical shafts each attached to a one of the two members attached to the mirror. Each of the shafts extended outward through the vacuum containment into which the refocusing mirror was assembled, and the curvature of the mirror was adjusted through a mechanism on the exterior of the apparatus which adjusted the distance between the upper ends of the two arms extending through the vacuum containment. That adjustment in turn caused the members attached to the mirror to be rotated to bend the ends of the mirror to adjust the curvature of the mirror. This installation required two separate shafts extending through the vacuum containment of the apparatus into which the mirror was installed.

SUMMARY OF THE INVENTION

The present invention is summarized in that a manipulator for adjusting the curvature of a bendable mirror positioned inside of a high-vacuum optical apparatus includes: a mounting plate adapted for attachment to the optical apparatus to serve as a portion of the vacuum containment thereof; a manually adjustable micrometer positioned on the exterior of the mounting plate; a single feedthrough shaft attached to and operable by the micrometer, the feedthrough shaft extending through the mounting plate; a saddle member secured to the feedthrough shaft inside the vacuum of the optical apparatus; and a pair of drawbridge members mounted underneath of the mounting plate, each of the drawbridge members secured to one end of the mirror at one end thereof and resting on a portion of the saddle member at the other end thereof, each of the drawbridge members being rotatably mounted so that vertical movements of the feedthrough shaft as operated by the micrometer cause the saddle member to vertically move one end of each of the drawbridge members, thereby rotating the drawbridge members to adjust the curvature of the mirror.

It is an object of the present invention to provide a refocusing mirror manipulator which is capable of adjusting the curvature of a bendable mirror contained inside of a high-vacuum optical apparatus.

It is another object of the present invention to provide such a manipulator which includes a minimum of mechanical linkages which must pass through the vacuum containment of the optical apparatus.

It is yet another object of the present invention to provide such a manipulator which is capable of exact incremental adjustments of the curvature of the mirror.

Other objects, advantages and features of the present invention will become apparent from the following specification when taken in conjunction with the accompanying drawings.

BRIEF DESCRIPTION OF THE DRAWINGS

FIG. 3 is a right-hand end view of the refocusing mirror manipulator of FIG. 1.

FIG. 4 is a bottom plan view of the refocusing mirror manipulator of FIG. 1.

FIG. 5 is an enlarged cross-sectional cut-away view showing the saddle member as it contacts the two drawbridge members within the refocusing mirror manipulator of FIG. 1.

DESCRIPTION OF THE PREFERRED EMBODIMENT

Figure 1:
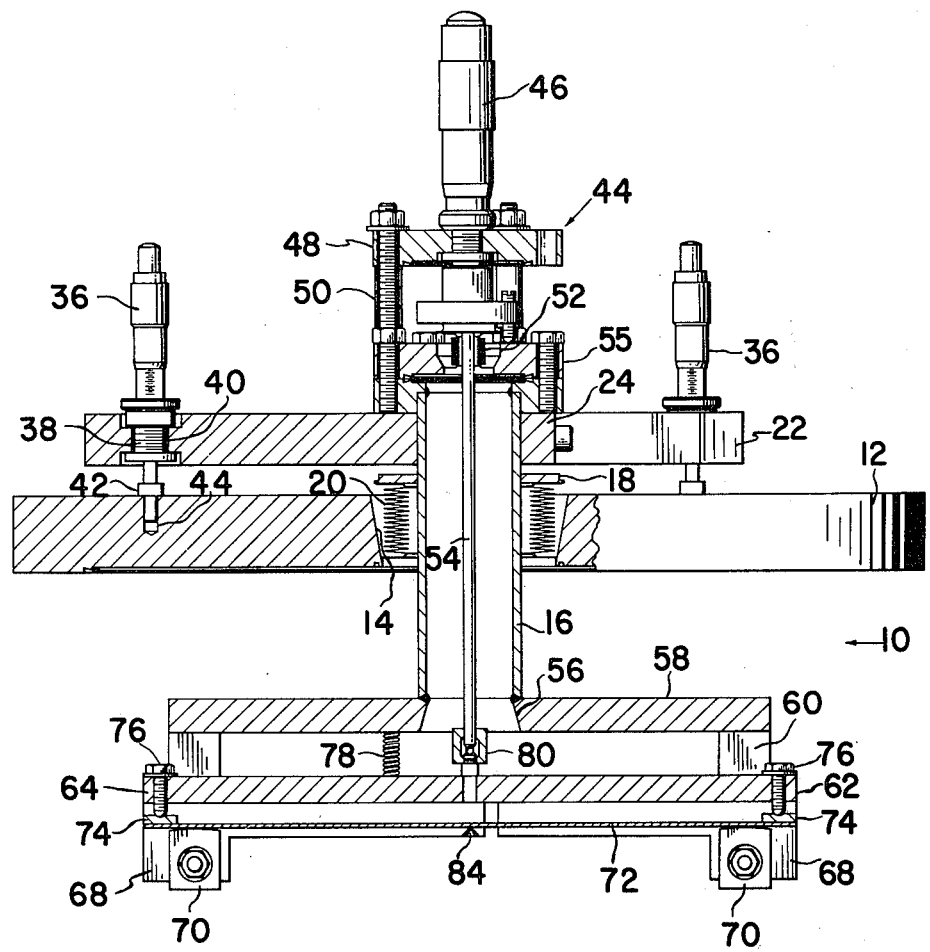
FIG. 1 is a cross-sectional side view of a refocusing mirror manipulator constructed in accordance with the present invention.

Shown in FIG. 1, and generally illustrated at 10, is a refocusing mirror manipulator assembly constructed in accordance with the present invention. The refocusing mirror manipulator 10 is constructed around a mounting plate 12 which is adapted to be incorporated into the vacuum containment housing of a high-vacuum optical apparatus into which the refocusing mirror is to be installed. A centrally located, conically shaped passageway 14 is formed through the center of the mounting plate 12 so as to allow a cylindrical, hollow feedthrough housing 16 to extend therethrough. An annular cover plate 18 is secured around the exterior of the feedthrough housing 16 and has one end of a bellows 20 attached thereto with the other end of the bellows 20 being secured to the interior of the passageway 14 so as to form a vacuum-tight seal between the cover plate 18 and the mounting plate 12. Attached to the top end of the feedthrough housing 16 is a base plate 22. As can best be seen in the top view shown in FIG. 2, the base plate 22 is a generally C-shaped member positioned parallel to and spaced above the mounting plate 12 and is sized so that the arms of the C fit around the feedthrough housing 16. A yoke plate 24 is sized to fit around the other side of the feedthrough housing 16 to be bolted to the base plate 22 so as to secure the base plate 22 around the feedthrough housing 16 as again can be best seen in FIG. 2. The base plate 22 is initially fixed in its position as it is mounted on the feedthrough housing 16 by a pair of slots 26 which are formed on the two arms of the base plate 22. Each of the slots 26 is inserted over the shaft of a respective one of two guide rod assemblies 28. Each of the guide rod assemblies 28 includes, as can be seen in FIG. 3, a compression spring 30 which is compressed between a bushing 32 at the top of the guide rod assembly 28 and a bushing 34 which is pressed against the base plate 22. At their bottom ends, the guide rod assemblies 28 are secured to the mounting plate 12.

Figure 2:
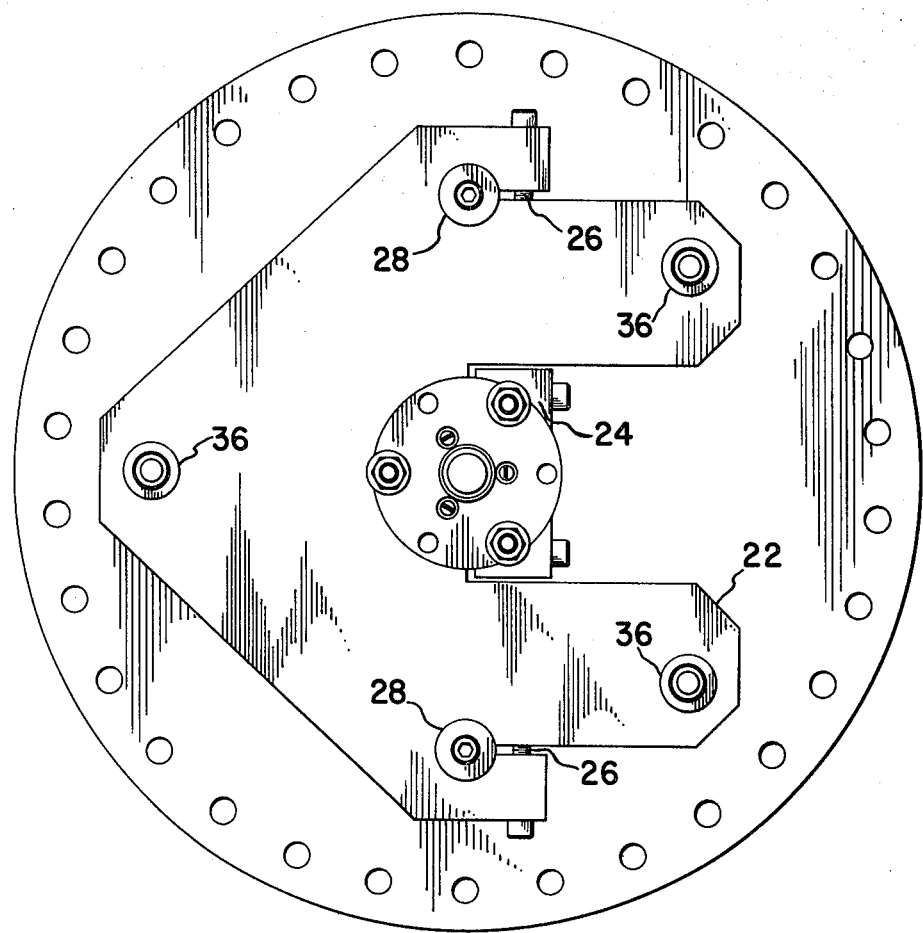
FIG. 2 is a top plan view of the refocusing mirror of FIG. 1.

Extending through the base plate 22 and abutting the mounting plate 12 are three alignment micrometers 36. As can be seen in FIG. 2, the three alignment micrometers 36 are located equally spaced from each other so as to form a triangular pattern centered on the feedthrough housing 16. Each of the adjusting micrometers includes a collar 38, shown only in FIG. 1, which is designed to interfit with an annular ring 40 provided in the base plate 22 so that the housing of the micrometer 36 is fixed to the base plate 22. The shaft of each micrometer 36 also has an annular rest stop 42 provided on it abutting the surface of the mounting plate 12 while the shaft of the micrometer extends into a bore 44 provided in the face of the mounting plate 12. Each of the three adjusting micrometers 36 is separately manually adjustable so that its shaft can be extended or retracted in small increments.

Mounted on the very top of the feedthrough housing 16 and centrally located thereon is a linear feed mechanism generally indicated at 44. The linear feed mechanism 44 includes a micrometer 46 which is also manually adjustable and which is mounted on a micrometer plate 48 suspended on a micrometer mounting 50 above the top of the feedthrough housing 16. A bellows 52 is provided to form a vacuum-tight fitting between a cover 55 provided on top of the feedthrough housing 16 and the body of the micrometer 46. The bellows 52 surrounds the shaft of the micrometer 46 so as to provide a vacuum-tight seal at the top of the feedthrough housing 16. A feedthrough shaft 54 operated by the micrometer 46 extends downward from the micrometer 46 through the center of the feedthrough housing 16. The feedthrough shaft 54 extends downwardly through the bottom of the feedthrough housing 16 and through a centrally located hole 56 formed in a mirror holder mounting 58. The mirror holder mounting 58 is an elongated, horizontal, rectangular plate with four legs 60 depending downwardly therefrom, with two of the legs 60 being located opposite from each other at each opposite longitudinal end of the mirror holder mounting 58.

Mounted inside of the mirror holder mounting 58 are a pair of drawbridge members 62 and 64. Each of the drawbridge members 62 and 64 is rotatably suspended in place inside of the legs 60 at the opposite ends of the mirror holder mounting 58 by a pair of pintle pins 66 which abut the sides of each of the drawbridge members 62 and 64. There is one pintle pin 66 for each of the legs 60 depending from the mirror holder mounting 58 with each of the pintle pins extending transversely through the respective leg 60 inwardly toward the side of the respective drawbridge member 62 or 64. Each of the pintle pins 66 ends in a tapered portion which is inserted into a correspondingly formed dimple 67 formed in the opposite sides of each of the drawbridge members 62 and 64. Since the pintle pins 66 have their tapered end received inside of the dimples on the opposite sides of the drawbridge members 62 and 64, the drawbridge members 62 and 64 are retained in place, but are free to move in a rotational fashion with the axis of rotation being through the dimples formed in the opposite sides of each of the drawbridge members 62 and 64.

The drawbridge members 62 and 64 are similar in construction. At their base end, each of the drawbridge members 62 and 64 are generally U-shaped as can be seen by reference to the end of drawbridge member 62 shown in the end view of FIG. 3. Each of the drawbridge members 62 and 64 includes at that base end a pair of downwardly depending flanges 68, with each of the downwardly depending flanges 68 having a rest button 70 mounted on the interior thereof. Each of the rest buttons 70 is a rectangular piece of flattened metal having a slightly curved upper surface. Along the top of the two rest buttons 70, a mirror 72 is mounted. The mirror 72 is an elongated, deformable metallic mirror which is formed as a long, rectangular strip of material of uniform thickness, width and density. The mirror 72 is formed of resilient bendable material and is of uniformity in its thickness, its width, and its elasticity so that bending moments applied to its ends are evenly distributed along the length of the mirror 72.

Mounted on the mirror 72 at each of its ends is a respective mirror plate 74. A nut 76 is threaded down through the end of each of the drawbridge members 62 and 64 to abut at the top edge of the mirror plates 74 which are in contact with the opposite ends of the mirror 72. The assembly of the nut 76 and the mirror plate 74 is designed to insure that the ends of the mirror are held firmly between the mirror plate 72 and the top of the respective rest button 70 at each end of the mirror 72. From the nut 76, each of the respective drawbridge members 62 and 64 extends inwardly toward the center of the mirror manipulator 10 as shown in FIG. 1. As can be seen by referring to the dash lines shown in FIG. 4, the top surface of each of the drawbridge members 62 and 64 is narrowed at an angle so that at the center of the mirror manipulator 10 each of the drawbridge members 62 and 64 is positioned only on one or the other side of the mirror 72. Thus, each of the drawbridge members 62 and 64 has two downwardly depending sides at its portion adjacent to its respective end of the mirror 72 but includes only one side at its portion adjacent to the center of the mirror 72. In function, the end of each of the drawbridge members 62 and 64 toward the center of the mirror manipulator serves as an elongated lever arm which serves to pivot the drawbridge member 62 or 64 arounds its respective pivot point formed by the respective pair of pintle pins 66. A compression spring 78 is positioned between each of the drawbridge members 62 and 64 and the inside surface of the mirror holder mounting 58.

As can be seen in the cross-sectional view of FIG. 5, at its lower end, the feedthrough shaft 54 is attached to a fitting 80 formed on the top of a saddle member 82. The saddle member 82 is a downwardly oriented U-shaped member which is constructed of a size sufficient so as to be received entirely within and underneath the mirror holder mounting 58 and yet to extend completely around the central ends of the drawbridge members 62 and 64. At the bottom of the downwardly extending arms of the U formed by the saddle member 82, there are formed a pair of knife edges 84 which extend inwardly toward each other. Each one of the knife edges 84 is received within a respective triangular cutout formed in the bottom edge of the appropriate one of the drawbridge members 62 and 64. Since the ends of the drawbridge members 62 and 64 toward the center of the mirror manipulator are downwardly biased by the compression spring 78, the ends of the drawbridge members 62 and 64 constantly rest against the knife edges 84 of the saddle member 82.

In its operation, the refocusing mirror manipulator 10 of FIGS. 1 to 5 serves as an adjustable mirror bending device so as to uniformly and adjustably alter the curvature of the mirror 72 so as to adjust the focus thereof. The manipulator 10 is constructed so that it is capable of adjusting the curvature of the mirror 72 while the mirror 72 is inside of an ultra-high vacuum environment. The manipulator 10 is constructed so that the linkage between the manual control on the exterior of the vacuum containment is capable of manipulating the mirror 72 inside of the vacuum containment with a minimum of mechanical linkages feeding through the vacuum containment so as to avoid excess leakage or degradation of the vacuum.

Referring specifically to drawing FIGS. 1 to 5, the alignment micrometers 36 serve to align the base plate 22 relative to the mounting plate 12 so as to form an adjustably stable platform for the mounting of the mirror 72. By the use of the three alignment micrometers 36, it is possible to completely adjust the plane of the base plate 22 and the angle at which the feedthrough housing 16 passes through the cover plate 12 into the interior of the vacuum containment on the other side thereof so that a complete three-dimensional alignment of the mirror 72 carried by the manipulator 10 can be achieved. The alignment micrometers 36 operate by pressing against the top of the cover plate 12 with the buttons 42 which are raised or lowered by appropriate manual manipulation of the alignment micrometers 36. Thus, the alignment micrometers 36 serve as an adjustment mechanism to position and align the refocusing mirror 72 in its original installation and are not used actually to manipulate the mirror once the device is installed.

The micrometer 46 is used for actual manipulations of the curvature of the mirror 72 itself. Rotations of the micrometer 46 cause the feedthrough shaft 54 to be raised and lowered in a linear fashion in accordance with the incremental movements of the micrometer 46 as it is manually operated. Vertical movements of the feedthrough shaft 54 are passed through by the linkage 80 to the saddle member 82. Thus, the saddle member 82 is directly controlled by the micrometer 46 and is raised and lowered by operation thereof. The raising and lowering of the saddle member 82 causes the knife edges 84 to appropriately raise and lower, thereby also raising and lowering the inside ends of the drawbridge members 62 and 64. Thus, the appropriate manipulation of the micrometer 46 causes the interior ends of the drawbridge members 62 and 64 to be incrementally raised and lowered in a preselectable and incremental fashion.

As the ends of the drawbridge members 62 and 64 in the center of the apparatus as controlled by the knife edges 84 are raised and lowered, the drawbridges act to appropriately bend the mirror 72. This bending occurs inasmuch as when the inside edges of the drawbridge members 62 and 64 are raised, the drawbridge members 62 and 64 thereby pivot about the pintle pins 66 onto which they are mounted. Rotation of each of the drawbridge members 62 and 64 causes the mirror plates 74 to be pressed downward by the nuts 76, thereby pressing downward simultaneously on both of the ends of the mirror 72. The downward pressure on the ends of the mirror 72 is resisted by the rest buttons 70 which remain fixed because they are threadedly connected onto the depending flanges 68 formed on each of the drawbridge members 62 and 64. Thus, between the mirror plates 72 and the rest buttons 70, a bending moment is created at each end of the mirror 72. The two bending moments thus created at each end of the mirror 72 are equal and opposite in character causing a uniform bending moment to be experienced throughout the length of the mirror 72. As long as the mirror 72 is of uniform thickness, uniform width, and of constant density, the bending moment will be expressed linearly throughout the length of the mirror 72 and will cause a uniform curved deflection to be created in the mirror 72 thereby shaping the mirror 72 into a uniformly curved, spherical surface. The curvature of that surface can be appropriately adjusted through manipulations of the micrometer 46 in an incremental and preselectable fashion. Thus, appropriate manipulations of the micrometer 46 cause the curvature of the mirror 72 to be adjusted so that the focal length of the refocusing effects caused by the mirror 72 can be appropriately adjusted as is desired for the particular application.

As can thus be seen by the above discussion, the refocusing mirror of FIGS. 1 to 5 allows a curvable refocusing mirror 72 to be inserted inside of a high-vacuum environment for use in a high-vacuum optical apparatus and allows the curvature of that mirror to be minutely, accurately, and incrementally controlled through a manually manipulatable device positioned on the exterior of the vacuum containment vessel. Furthermore, the mirror manipulator of FIGS. 1 to 5 includes only one linkage passing through the vacuum containment vessel itself, thereby minimizing possibilities of degradation of the ultra-high vacuum in which it is advantageous to operate optical devices of the character which might utilize the refocusing mirror of 72. Furthermore, the apparatus is simple in character and operates in a predictable and accurate fashion as long as the mirror 72 can be constructed in a uniform fashion. In this way, a more accurate and readily utilizable refocusing mirror manipulator is disclosed herein than was heretofore possible.

It is further envisioned that the refocusing mirror apparatus as illustrated in FIGS. 1 to 5 may be utilized with other kinds of mirrors in which it is desired that an adjustable curvature be created in a mirror surface. Clearly, the drawbridge and bending moment creation apparatus as used in the refocusing mirror manipulator 10 may be equally applicable in other optical fields in which it is desired to create mirrors having adjustable curvature.

It is to be understood that the present invention is not limited to the particular construction and arrangement of parts illustrated and disclosed herein, but embraces all such modified forms thereof as come within the scope of the following claims.

I claim:

1. A manipulator for adjusting the curvature of a bendable mirror (72), positioned inside of a high-vacuum optical apparatus, comprising:

a mounting plate (12) adapted for attachment to the optical apparatus to serve as a portion of the vacuum containment thereof;

a manually adjustable micrometer (46) positioned on the exterior of the mounting plate (12);

a single feedthrough shaft (54) attached to and operable by the micrometer (46), the feedthrough shaft (54) extending through the mounting plate (12);

a saddle member (82) secured to the feedthrough shaft (54) on the interior side of the mounting plate (12); and a pair of drawbridge members (62, 64) rotatably mounted on the interior of the mounting plate (12), each of the drawbridge members (62, 64) secured to a respective end of the mirror (72) at one of its ends and resting on the saddle member (82) at the other of its ends so that vertical movements of the saddle member (82) cause rotational movements of the drawbridge members (62, 64) to thereby adjust the curvature of the mirror (72).

2. A mirror manipulator as claimed in claim 1 wherein an elongated mirror holder mounting (58) is secured on the interior of the mounting plate (12), wherein four downwardly depending legs (60) are formed on the mirror holder mounting (58), and wherein the drawbridge members (62, 64) are each rotatably mounted between a respective pair of the legs (60) of the mirror holder mounting (58).

3. A mirror manipulator as claimed in claim 2 wherein each drawbridge member (62, 64) has two sides adjacent the legs (60) of the mirror holder mounting (58), wherein there is a dimple formed on each of the sides of each of the drawbridge members (62, 64), and wherein there is a pintle pin (66) extending through each of the legs (60) of the mirror holder mounting (58) into the dimple in the side of the adjacent drawbridge member (62, 64) to rotatably mount the drawbridge member (62, 64) between the legs (60).

4. A mirror manipulator as claimed in claim 2 wherein a cylindrical feedthrough housing (16) extends through the mounting plate (12), the feedthrough shaft (54) received inside of the feedthrough housing (16), the mirror holder mounting (58) being secured to the bottom of the feedthrough housing (16).

5. A mirror manipulator as claimed in claim 2 wherein a compression spring (78) is located between the mirror holder mounting (78) and each of the drawbridge members (62, 64) to hold the drawbridge members (62, 64) against the saddle member (82).

6. A mirror manipulator as claimed in claim 1 wherein each of the drawbridge members (62, 64) includes a pair of downwardly depending flanges (68), wherein there is a rest button (70) attached to each of the flanges (68), a nut (76) extending downward through the end of each drawbridge member (62, 64), and a mirror plate (74) located under each of the nuts (76), the mirror (72) resting on the rest buttons (70) and having the mirror plates (74) positioned on the top of the ends thereof so that as each drawbridge member (62, 64) is rotated a bending moment is created at one end of the mirror (72) between the respective mirror plates (74) and rest buttons (70).

7. A mirror manipulator as claimed in claim 1 wherein there is a base plate (22) positioned above the mounting plate (12), the micrometer (46) being mounted on the base plate (22).

8. A mirror manipulator as claimed in claim 7 wherein there is a feedthrough housing (16) extending downward from the base plate (22) through the mounting plate (12) and a mirror holder mounting (58) positioned on the bottom of the feedthrough housing (16), the feedthrough housing enclosing the feedthrough shaft (54) and the mirror holder mounting (58) mounting the drawbridge members (62, 64).

9. A mirror manipulator as claimed in claim 8 wherein there are three alignment micrometers (36) arranged to vary the distance between the base plate (22) and the mounting plate (12) at three points so that the base plate (22) can be positioned and aligned to thereby position and align the mirror holder mounting (58) and the mirror (72).

* * * * *